(12) United States Patent
Boger et al.

(10) Patent No.: US 11,837,708 B2
(45) Date of Patent: Dec. 5, 2023

(54) DEVICE FOR THE TEMPERATURE OF AN ENERGY STORAGE DEVICE

(71) Applicant: Mahle International GmbH, Stuttgart (DE)

(72) Inventors: Markus Boger, Stuttgart (DE); Sascha Lindauer, Schorndorf (DE)

(73) Assignee: Mahle International GmbH

( * ) Notice: Subject to any disclaimer, the term of this patent is extended or adjusted under 35 U.S.C. 154(b) by 263 days.

(21) Appl. No.: 17/070,902

(22) Filed: Oct. 14, 2020

(65) Prior Publication Data

US 2021/0111450 A1    Apr. 15, 2021

(51) Int. Cl.
| | |
|---|---|
| H01M 10/6568 | (2014.01) |
| H01M 10/625 | (2014.01) |
| H01M 10/6552 | (2014.01) |
| H01M 10/6569 | (2014.01) |
| H01M 10/663 | (2014.01) |
| B60H 1/00 | (2006.01) |

(52) U.S. Cl.
CPC .... *H01M 10/6568* (2015.04); *B60H 1/00278* (2013.01); *H01M 10/625* (2015.04); *H01M 10/6552* (2015.04); *H01M 10/6569* (2015.04); *H01M 10/663* (2015.04); *B60H 2001/00307* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2009/0249807 | A1* | 10/2009 | Nemesh | B60H 1/00278 62/117 |
| 2010/0000709 | A1* | 1/2010 | Chang | F28D 20/0034 165/58 |
| 2017/0317393 | A1* | 11/2017 | Blatchley | H01M 10/613 |
| 2018/0236842 | A1* | 8/2018 | Allgaeuer | B60H 1/00278 |
| 2019/0016230 | A1* | 1/2019 | Wang | B60R 16/04 |
| 2019/0375270 | A1* | 12/2019 | Boger | B60H 1/00392 |

FOREIGN PATENT DOCUMENTS

DE    102014019659 A1    6/2015

OTHER PUBLICATIONS

English abstract for DE-102014019659.

* cited by examiner

*Primary Examiner* — Lisa S Park
(74) *Attorney, Agent, or Firm* — Fishman Stewart PLLC

(57) ABSTRACT

A temperature control device of a vehicle may include an energy storage device, a first coolant circuit configured to temperature control the energy storage device, a refrigerant circuit, at least one refrigerant evaporator, a second coolant circuit, a refrigerant condenser, and a coolant cooler for transferring heat to an exterior environment. At least one section of the first coolant circuit and at least one section of the second coolant circuit may be defined by a shared circuit section. The coolant cooler may be fluidically connectable with at least one of the first coolant circuit and the second coolant circuit via the shared circuit section. The first coolant circuit may include a bypass for at least partially bypassing the coolant cooler. The first coolant circuit may include a valve device structured and arranged to distribute a first coolant flow to at least one of the shared circuit section and the bypass.

20 Claims, 2 Drawing Sheets

DEVICE FOR THE TEMPERATURE OF AN ENERGY STORAGE DEVICE

CROSS-REFERENCE TO RELATED APPLICATIONS

This application claims priority to DE 10 2019 215 846.3, filed on Oct. 15, 2019, the contents of which is hereby incorporated by reference in its entirety.

TECHNICAL FIELD

The present invention relates to a device for the temperature control of an energy storage device of a vehicle and a method for operating such a device. The invention further relates to a vehicle with a device for the temperature control of an energy storage device.

BACKGROUND

In vehicles with electric drive, in particular in pure electric vehicles or hybrid vehicles, batteries are used for the storage of energy. These batteries should only be operated in a predefined temperature range, in order to prevent a damage and/or a premature ageing of the batteries. Therefore, such batteries must be temperature-controlled, in particular cooled or heated. In particular, such a battery must be protected from overheating, so that a heat dissipation must be ensured independently of the ambient temperature of the vehicle.

For the dissipation of the battery heat to the environment of the vehicle for example a coolant circuit with a low temperature cooler, flowed through by air, can be used, wherein the low temperature cooler, flowed through by air, is inserted in a vehicle cooling module of the vehicle. The low temperature cooler forms a radiator which is flowed through by the coolant of the coolant circuit and in so doing emits heat of the coolant to the ambient air of the low temperature cooler which is flowed through by air. With such a coolant circuit, a cooling of the battery can be realized up to a specified threshold temperature of the ambient temperature. This threshold temperature can depend on the respective application, in particular the coolant and/or the battery type and/or the configuration of the heat dissipation. If the ambient temperature exceeds this threshold temperature, a cooling is no longer possible via the coolant circuit by means of a low temperature cooler which is flowed through by air.

For cooling the battery at ambient temperatures above the threshold temperature, the coolant circuit can be coupled for example with a coolant-refrigerant heat exchanger (chiller) of a refrigerant circuit in a heat-transferring manner. A disadvantage herein is that in addition to the low temperature cooler, flowed through by air, of the coolant circuit, an additional separate air-cooled condenser of the refrigerant circuit must be arranged in the vehicle cooling module, in order to enable a cooling at ambient temperatures above the threshold temperature. Through the additional air-cooled condenser, the production costs of the vehicle, the required installation space in the vehicle and the overall weight of the vehicle are increased. Through the increased overall weight, the maximum range of the electrically operated vehicle is reduced.

Alternatively, a low temperature cooler, flowed though by air, in the coolant circuit can be dispensed with, wherein in such a configuration of the coolant circuit independently of the ambient temperatures of the vehicle always coupling must be carried out with a refrigerant circuit via a chiller in a heat-transferring manner, in order to enable a heat dissipation from the coolant circuit. Hereby, the production costs of the vehicle and the required installation space in the vehicle can indeed be reduced, because only an air-cooled condenser of the refrigerant circuit has to be arranged in the vehicle cooling module. However, the energy efficiency of this configuration is reduced, because for cooling the battery owing to the absent low temperature cooler of the coolant circuit, the refrigerant circuit must always be operated, so that the required mechanical and/or electrical driving power for a compressor of the refrigerant circuit must always be made available independently of the ambient temperatures of the vehicle. This has a negative effect on the maximum range or of the electrically operated vehicle. In hybrid vehicles, in particular in mild hybrid vehicles, the consumption, in particular the fuel consumption, can increase.

SUMMARY

The present invention is based on the problem of indicating an improved or at least an alternative embodiment of a device for the temperature control of an energy storage device, which is optimized in particular with respect to the production costs, the required installation space and the energy efficiency of the device.

This problem is solved according to the invention through the subject matter of the independent claim(s). Advantageous embodiments are the subject matter of the dependent claim(s).

The present invention is based on the general idea of realizing a heat dissipation from a coolant circuit and a heat dissipation from a refrigerant circuit to an environment of a vehicle via a shared coolant cooler. The device according to the invention for the temperature control of an energy storage device of a vehicle comprises an energy storage device for the electrical energy supply of an electric drive unit and/or other electric consumers of the vehicle. The vehicle can be an electrically driven vehicle and/or an electrified vehicle. The vehicle can be an electric vehicle, in particular a purely or respectively exclusively electrically driven electric vehicle, or a hybrid vehicle, in particular a plug-in hybrid vehicle. A hybrid vehicle can be a mild hybrid vehicle. A hybrid vehicle can be a mild hybrid vehicle with electrified auxiliary units.

The vehicle can be a trackless road vehicle. The energy storage device can have an energy store which can make available an electric power which is necessary for the drive of the vehicle. The energy store can form a traction battery unit and/or a traction accumulator unit. A traction battery unit and/or a traction accumulator unit can support the drive of the vehicle (e.g. in connection with an internal combustion engine) or can operate it alone. Alternatively or additionally, the energy storage device and/or the energy store can supply other electric consumers of the vehicle with electric power. Another electric consumer of the vehicle can be, for example, an electrified auxiliary unit, e.g. a compressor and/or a compressor unit, of the vehicle. In such a case, the vehicle can be, for example, a mild hybrid vehicle with electrified auxiliary units.

The energy storage device can have an energy storage temperature-control device, in particular an energy storage temperature-control device which is flowed through by coolant. The energy storage temperature-control device can be configured for example in a plate-shaped manner.

Furthermore, the device has a first coolant circuit for the temperature control of the energy storage device. A temperature control can be understood to mean a cooling or a heating. In the first coolant circuit, a coolant can be conveyed in a circulating manner.

The energy storage device can be coupled with the first coolant circuit in a heat-transferring manner. Provision can be made that at least one partial region of the energy storage device, in particular an energy storage temperature-control device, can be flowed through by the coolant.

Furthermore, the device has a refrigerant circuit, which is able to be coupled with the first coolant circuit in a heat-transmitting manner by means of at least one refrigerant evaporator. In the refrigerant circuit at least one refrigerant can be conveyed in a circulating manner. The refrigerant circuit and the first coolant circuit can be separated from one another fluidically. The refrigerant circuit can be able to be coupled with the first coolant circuit in a heat-transferring manner via two or more refrigerant evaporators. The refrigerant evaporator can be a coolant-refrigerant heat exchanger (chiller).

A heat-transferred coupling between the first coolant circuit and the refrigerant circuit can be present when the coolant and the refrigerant flow through the refrigerant evaporator, wherein the refrigerant evaporates in the refrigerant evaporator and, in so doing, receives heat of the coolant during the evaporation process, so that a cooling of the coolant is realized.

Furthermore, the device has a second coolant circuit, which is able to be coupled with the refrigerant circuit in a heat-transferring manner by means of a refrigerant condenser which is cooled by coolant. In the second coolant circuit, the coolant can be conveyed in a circulating manner. The refrigerant circuit and the second coolant circuit can be separated from one another fluidically. The coolant-cooled refrigerant condenser can be an indirect condenser.

A heat-transferred coupling between the second coolant circuit and the refrigerant circuit can be present when the coolant and the refrigerant flow through the refrigerant condenser, wherein the refrigerant condenses in the refrigerant condenser and in so doing emits heat to the coolant during the condensation process, so that a heating of the coolant is realized.

Furthermore, the device has a coolant cooler for the heat transfer between the first coolant circuit and an exterior environment of the device and/or for the heat transfer between the second coolant circuit and the exterior environment of the device. The exterior environment of the device can also be the environment of the electrically driven vehicle.

The coolant cooler can form a coolant cooler which is flowed around by air and/or is flowed through by air, in particular a low temperature cooler which is flowed around by air and/or is flowed through by air, and/or a radiator. A fan device can be associated with the coolant cooler, which fan device can generate and/or intensify a corresponding air flow around the coolant cooler. The coolant cooler can be arranged in a vehicle cooling module of the vehicle, in particular a vehicle cooling module arranged in a front partial region of the vehicle with respect to a forward travel direction of the vehicle. In a lorry and/or a truck, the vehicle cooling module and/or the coolant cooler can be formed as an additional system. Such an additional system can be arranged on a roof of the vehicle and/or behind a cab, in particular a driver's cab.

At least one partial section of the first coolant circuit and at least one partial section of the second coolant circuit are formed by a shared circuit section, wherein the coolant cooler is arranged in the shared circuit section. The coolant cooler is able to be fluidically connected via the shared circuit section with the first coolant circuit and/or with the second coolant circuit. The first coolant circuit has a bypass for the at least partial bypassing or for the complete bypassing of the coolant cooler. The bypass can be a bypass fluid line.

The first coolant circuit has a valve device for the distribution of a coolant flow to the shared circular section and the bypass. The valve device can be configured as a proportional valve, in particular as a three-way proportional valve.

The valve device can be arranged upstream of the coolant cooler with respect to a conveying direction. For this, the valve device can have a fluid inlet and two fluid outlets. The fluid inlet can be fluidically connected with a section of the first coolant circuit downstream of the energy storage device. A first fluid outlet of the valve device can be fluidically connected with the shared circuit section, whereas a second fluid outlet of the valve device can be fluidically connected with the bypass. The valve device enables a variable distribution of the first coolant flow, which flows into the valve device via the fluid inlet, to the shared circuit section, in particular to the coolant cooler, and to the bypass. The valve device can have an open position, in which the first coolant flow flows entirely through the coolant cooler. The valve device can have a bypass position, in which the first coolant flow flows entirely through the bypass. The valve device can occupy any desired intermediate positions between the first position and the second position, in order to realize a variable distribution of the first coolant flow.

The valve device can be arranged downstream of the coolant cooler with respect to the conveying direction. For this, the valve device can have two fluid inlets and one fluid outlet. A first fluid inlet of the valve device can be fluidically connected with the shared circuit section, whereas a second fluid inlet of the valve device can be fluidically connected with the bypass. The fluid outlet can be fluidically connected with a section of the first coolant circuit upstream of the refrigerant evaporator. The valve device enables a variable convergence of the first coolant flow, which flows in via two fluid inlets into the valve device, to the partial section of the first coolant circuit upstream of the refrigerant evaporator. The valve device can have an open position, in which the first coolant flow flows entirely through the coolant cooler. The valve device can have a bypass position, in which the first coolant flow flows entirely through the bypass. The valve device can occupy any desired intermediate position between the first position and the second position, in order to realize a variable distribution of the first coolant flow.

A cooling circuit can be provided for the cooling of drive units of the vehicle or respectively a vehicle drive cooling, which for example is formed independently of the first coolant circuit, independently of the second coolant circuit and independently of the refrigerant circuit. Here, the vehicle drive cooling can have a separate cooler, which can be arranged for example in the vehicle cooling module of the vehicle.

A cooling circuit can be provided for the cooling of drive units of the vehicle or respectively a vehicle drive cooling, in which the coolant cooler of the device is shared, so that the first cooling circuit, the second cooling circuit and the vehicle drive cooling share or respectively jointly use the coolant cooler.

The device according to the invention enables a supporting use of the refrigerant circuit when the ambient temperature lies above the threshold temperature, wherein the refrigerant circuit can be switched off for example at ambient temperature and below the threshold temperature. Hereby, the energy efficiency of the device can be improved compared to the prior art. As the coolant circuits and the refrigerant circuit share a coolant cooler for the dissipation of thermal energy to the exterior environment of the device, the required installation space, in particular the required installation space in the vehicle cooling module, and the production costs can be reduced.

In an advantageous further development of the solution according to the invention, provision is made that the device has a first operation configuration, in which the first coolant circuit and the refrigerant circuit are substantially decoupled with respect to a heat transfer via the refrigerant evaporator, and/or that the device has a second operation configuration, which is set up for the heat transfer from the first coolant circuit via the refrigerant evaporator to the refrigerant circuit.

A heat transfer from the first coolant circuit via the refrigerant evaporator to the refrigerant circuit can be present when a refrigerant flows through the refrigerant evaporator, evaporates in the refrigerant evaporator and, in so doing, receives heat from the coolant.

Through the two operation configurations, the refrigerant circuit can be added, if this is necessary, therefore when the ambient temperature is above the threshold temperature. Hereby, the energy efficiency of the device can be optimized.

The refrigerant circuit can have a refrigerant conveying device, in particular an electrically operated refrigerant conveying device, which conveys a refrigerant along a conveying direction in the refrigerant circuit. The refrigerant conveying device can form a refrigerant compressor.

The refrigerant circuit can have a first expansion valve device, which can be arranged upstream of the refrigerant evaporator with respect to the conveying direction. The first expansion valve device can have a thermal expansion valve or an electric expansion valve.

The first operation configuration can be realized for example in that a conveying of the refrigerant in the refrigerant circuit is adjusted by the refrigerant conveying device and/or that the first expansion valve device is entirely closed, so that no refrigerant can flow into the refrigerant evaporator.

In a further advantageous embodiment of the solution according to the invention, provision is made that the valve device in the first operation configuration is set up in an open position in which the first coolant flow of the first coolant circuit flows entirely through the shared circuit section, and/or that the valve device in the first operation configuration is set up in at least one intermediate position, in which the first coolant flow of the first coolant circuit flows partially through the bypass and partially through the shared circuit section, and/or that the valve device in the first operation configuration is set up in a bypass position in which the first coolant flow of the first coolant circuit flows entirely through the bypass.

In the first operation configuration of the device, the temperature control performance, in particular the cooling performance, of the first coolant circuit can be adapted and/or regulated via the intermediate positions of the valve device. This is relevant in particular in the case of low, in particular negative (below 0° C.) ambient temperatures, when despite a cooling requirement of the energy storage device, a drop of the temperature level of the energy storage device which is too low must be avoided. In the open position of the valve device, the maximum available temperature performance, in particular the maximum available cooling performance, of the first coolant circuit can be made available.

In an advantageous further development of the solution according to the invention, provision is made that in the second operation configuration of the device, the first coolant circuit and the refrigerant circuit are coupled in a heat-transferring manner with respect to a heat transfer via the refrigerant evaporator. In the second operation configuration of the device, the valve device is set up in a bypass position, in which the first coolant flow of the first coolant circuit flows entirely through the bypass, so that the first coolant circuit and the second coolant circuit are substantially decoupled from one another fluidically.

The first coolant circuit can have a first cooling conveying device. The second coolant circuit can have a second coolant conveying device. The first cooling conveying device can be an electrically operated coolant conveying device. The second coolant conveying device can be an electrically operated coolant conveying device. A fluidic decoupling can be formed via the conveying performance of the first coolant conveying device and of the second coolant conveying device. Here, provision can be made that a first coolant flow of the first coolant circuit circulates in the device and/or flows through the device in a locally and/or spatially separate manner from a second coolant flow of the second coolant circuit. Provision can also be made that the first coolant circuit and the second coolant circuit are fluidically separated from one another via an additional shut-off valve.

The device in the second operation configuration is set up for heat transfer from the first coolant circuit via the refrigerant evaporator to the refrigerant circuit. A heat transfer from the first coolant circuit via the refrigerant evaporator to the refrigerant circuit can be present when a refrigerant flows through the refrigerant evaporator, evaporates in the refrigerant evaporator and, in so doing, receives heat from the coolant.

In the second operation configuration, the device is set up for heat transfer from the refrigerant circuit via the refrigerant condenser to the second coolant circuit. A heat transfer form the refrigerant circuit via the refrigerant condenser to the second coolant circuit can be present when a refrigerant flows through the refrigerant condenser, condenses in the refrigerant condenser and, in so doing, emits heat to a coolant in the second coolant circuit.

In the second operation configuration, the device is set up for heat transfer from the second coolant circuit via the coolant cooler to the exterior environment of the device.

In the second operation configuration, a sufficient cooling of the energy storage device is ensured at ambient temperatures above the threshold temperature.

In a further advantageous embodiment of the solution according to the invention provision is made that the refrigerant circuit has an evaporator device for the temperature control of a vehicle interior air flow, and/or that the refrigerant circuit has an interior heat exchanger for the precooling of a fluid refrigerant flow of the refrigerant circuit.

The device can comprise an air conditioning unit, in particular a HVAC module, wherein the evaporator device can be configured at least as a component of this air conditioning unit.

The evaporator device can form an air-cooled refrigerant evaporator. The evaporator device can be flowed through by refrigerant of the refrigerant circuit, wherein the refrigerant evaporates in the evaporator device and, in so doing, extracts heat from the vehicle interior air flow.

The interior heat exchanger for the pre-cooling of a fluid refrigerant flow of the refrigerant circuit can increase the efficiency of the refrigerant circuit. Here, a vaporous refrigerant flow can flow through the interior heat exchanger, in order to achieve a pre-cooling of the fluid refrigerant flow.

In an advantageous further development of the solution according to the invention provision is made that in the first operation configuration of the device, the evaporator device for the temperature control of a vehicle interior air flow is integrated into the refrigerant circuit. The device is set up in the first operation configuration for the heat transfer from the refrigerant circuit via the refrigerant condenser to the second coolant circuit.

The refrigerant circuit can have a second expansion valve device, which can be arranged upstream of the evaporator device with respect to the conveying direction. The second expansion valve device can have a thermal expansion valve or an electric expansion valve.

The integrating of the evaporator device can be realized for example in that the refrigerant conveying device is operated and that the second expansion valve device is at least partially opened, so that refrigerant can flow into the evaporator device.

If a heating of the energy storage device is necessary and the evaporator device controls the temperature of a vehicle interior air flow, the waste heat of the refrigerant condenser can be used for heating the energy storage device. For this, provision can be made that a heat transfer is prevented from the first coolant circuit via the coolant cooler to the exterior environment of the device and/or a heat transfer from the second coolant circuit via the coolant cooler to the exterior environment of the device. For this, the flowing through of the coolant cooler can be prevented and/or adapted and/or diverted for example with a radiator shutter in such a way that a heat transfer to the exterior environment of the device is prevented, in particular is substantially prevented.

In the first operation configuration, the device is set up for heat transfer from the first coolant circuit and from the second coolant circuit via the coolant cooler to the exterior environment of the device, or the device is set up in the first operation configuration for the prevention of a heat transfer from the refrigerant circuit via the refrigerant condenser to the second coolant circuit.

A prevention of a heat transfer from the refrigerant circuit via the refrigerant condenser to the second coolant circuit can be realized for example in that a conveying of the refrigerant is adjusted in the refrigerant circuit through the refrigerant conveying device.

In an advantageous further development of the solution according to the invention, provision can be made that in the first operation configuration of the device the evaporator device is integrated into the refrigerant circuit for the temperature control of a vehicle interior air flow. In the first operation configuration, the device can be set up for heat transfer from the refrigerant circuit via the refrigerant condenser to the second coolant circuit.

If a heating of the energy storage device is necessary and the evaporator device controls the temperature of a vehicle interior air flow, the waste heat of the refrigerant condenser can be used for heating the energy storage device. For this, provision can be made that a heat transfer is prevented from the first coolant circuit via the coolant cooler to the exterior environment of the device and/or a heat transfer is prevented from the second coolant circuit via the coolant cooler to the exterior environment of the device. For this, this flowing through of the coolant cooler can be prevented and/or adapted and/or diverted for example with a radiator shutter in such a way that a heat transfer to the exterior environment of the device is prevented, in particular is substantially prevented.

In a further advantageous embodiment of the solution according to the invention provision is made that in the second operation configuration of the device the evaporator device for temperature control of a vehicle interior air flow is integrated into the refrigerant circuit, or that in the second operation configuration of the device the evaporator device is separated fluidically from the refrigerant circuit.

A fluidic separation of the evaporator device from the refrigerant circuit can be realized for example in that the second expansion valve device is entirely closed, so that no refrigerant can flow into the evaporator device.

Hereby, the operation of the evaporator device can be added as required.

In an advantageous further development of the solution according to the invention provision is made that the interior heat exchanger is flowed through by a vaporous refrigerant flow of the refrigerant circuit for the pre-cooling of a fluid refrigerant flow of the refrigerant circuit. Hereby, the efficiency of the refrigerant circuit can be optimized.

In a further advantageous embodiment of the solution according to the invention provision is made that the first coolant circuit has a first coolant conveying device for the conveying of the first coolant flow in the first coolant circuit along a conveying direction, and/or that the second coolant circuit has a second coolant conveying device for the conveying of a second coolant flow in the second coolant circuit along a conveying direction, and/or that the refrigerant circuit has a refrigerant conveying device for the conveying of a refrigerant flow in the refrigerant circuit along a conveying direction.

The first coolant conveying device can be formed separately with respect to the second coolant conveying device. The first coolant conveying device and/or the second coolant conveying device can be formed as a fluid pump, in particular as a water pump.

The first coolant conveying device and/or the second coolant conveying device and/or the refrigerant conveying device can be formed as an electrically operated conveying device.

Furthermore, the invention relates to a method for the operation of a device according to the invention, in which at ambient temperatures below a predefined threshold temperature the device carries out a direct heat transfer from the first coolant circuit via the coolant cooler to the exterior environment and/or carries out a direct heat transfer from the second coolant circuit via the coolant cooler to the exterior environment, and/or in which at an ambient temperature corresponding to the predefined threshold temperature or at ambient temperatures above the predefined threshold temperature the device carries out an indirect heat transfer from the first coolant circuit via the coolant cooler to the exterior environment, wherein between the first coolant circuit and the coolant cooler the refrigerant circuit and the second coolant circuit are interposed in a heat-transferring manner.

The method according to the invention enables a supporting use of the refrigerant circuit when the ambient temperature lies above the threshold temperature, wherein the refrigerant circuit at ambient temperatures below the threshold temperature can be switched off for example. Hereby can the energy efficiency of the device can be improved compared to the prior art.

In an advantageous further development of the solution according to the invention provision is made that the device at ambient temperatures below the predefined threshold temperature is operated in the first operation configuration, and/or that the device at an ambient temperature corresponding to the predefined threshold temperature or at ambient temperatures above the predefined threshold temperature is operated in the second operation configuration.

In a further advantageous embodiment of the solution according to the invention provision is made that the device in the second operation configuration carries out a heat transfer from the first coolant circuit via the refrigerant evaporator to the refrigerant circuit, that the device in the second operation configuration carries out a heat transfer from the refrigerant circuit via the refrigerant condenser to the second coolant circuit, that the device in the second operation configuration carries out a heat transfer from the second coolant circuit via the coolant cooler to the exterior environment of the device.

In an advantageous further development of the solution according to the invention provision is made that the evaporator device controls the temperature of a vehicle interior air flow, that the device carries out a heat transfer from the refrigerant circuit via the refrigerant condenser to the second coolant circuit, that the device carries out a heat transfer from the first coolant circuit via the coolant cooler to the exterior environment of the device, and/or that the device carries out a heat transfer from the second coolant circuit via the coolant cooler to the exterior environment of the device.

The invention further relates to a vehicle with an energy storage device for the electrical energy supply of an electric drive unit and/or other electrical consumers of the vehicle and with a device according to the invention for the temperature control of an energy storage device.

The vehicle can be an electrically driven vehicle which has an electric drive unit for the drive of the vehicle. The vehicle can be an electrically driven vehicle and/or an electrified vehicle. The vehicle can be an electric vehicle, in particular a purely or respectively exclusively electrically driven electric vehicle, or a hybrid vehicle, in particular a plug-in hybrid vehicle. A hybrid vehicle can be a mild hybrid vehicle. A hybrid vehicle can be a mild hybrid vehicle with electrified auxiliary units. The vehicle can be a trackless road vehicle.

The energy storage device can have an energy store which can make an electric power available which is necessary for the drive of the vehicle. The energy store can form a traction battery unit and/or a traction accumulator unit. A traction battery unit and/or a traction accumulator unit can support the drive of the vehicle (e.g. in connection with an internal combustion engine) or operate it alone. Alternatively or additionally, the energy storage device and/or the energy store can supply other electric consumers of the vehicle with electric power. Another electric consumer of the vehicle can be, for example, an electrified auxiliary unit, e.g. a compressor and/or a compressor unit, of the vehicle. In such a case, the vehicle can be for example a mild hybrid vehicle with electrified auxiliary units.

The energy storage device can have an energy storage temperature-control device, in particular an energy storage temperature-control device which is flowed through by coolant. The energy storage temperature-control device can be formed, for example, in a plate-shaped manner.

The electric drive unit can have, for example, a rotating electric machine and/or an electric motor.

Hereby, the vehicle can be optimized in terms of cost and in terms of installation space, wherein at the same time the efficiency and the maximum range of the vehicle can be increased.

In an advantageous further development of the solution according to the invention, provision is made that the device according to the invention is operated according to a method according to the invention. For this, the device according to the invention can be configured for carrying out the method according to the invention. Hereby, the vehicle can be optimized in terms of cost and in terms of installation space, wherein at the same time the efficiency and maximum range of the vehicle can be increased.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively schematically

DETAILED DESCRIPTION

Figure 1:
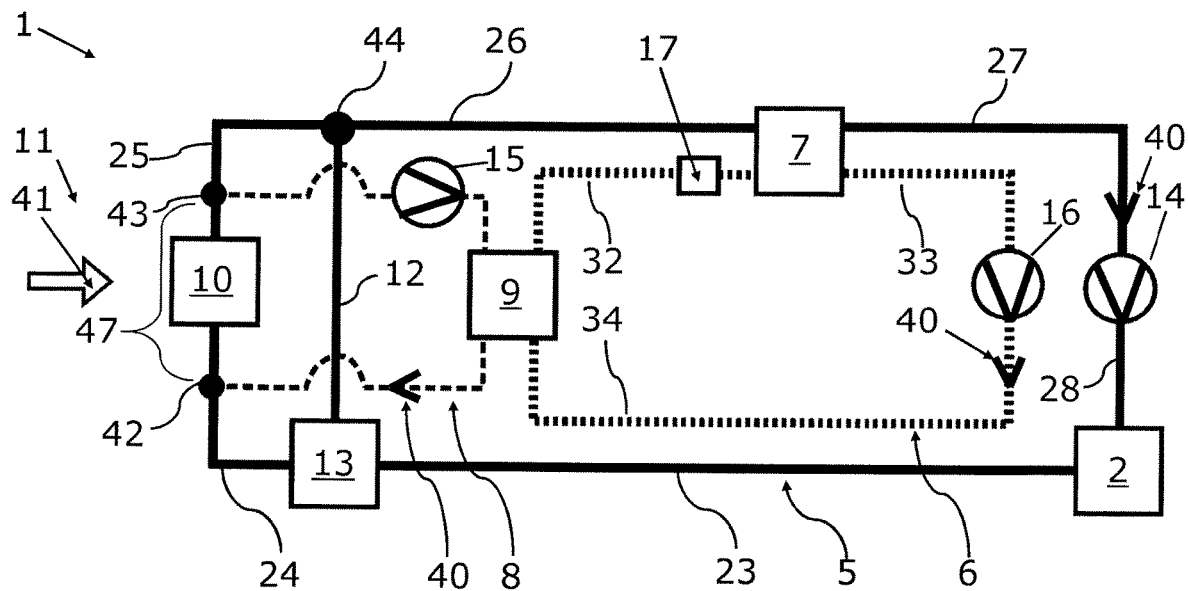
FIG. 1 shows a device according to the invention.
Figure 2:
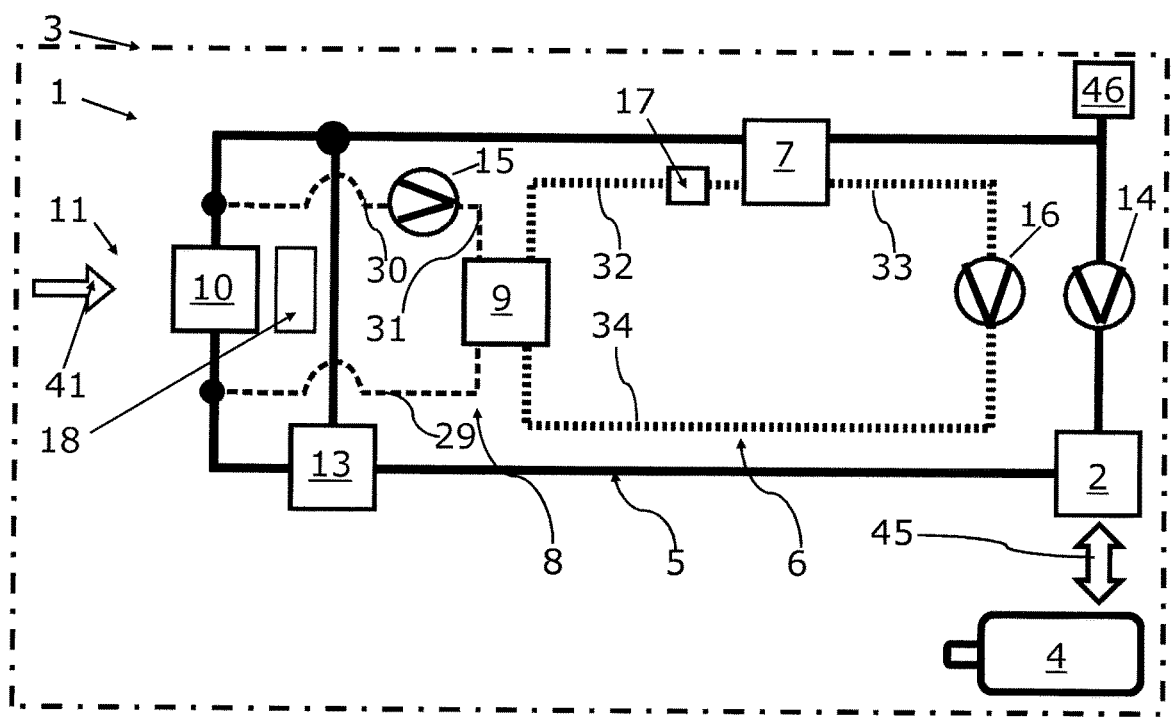
FIG. 2 shows a vehicle according to the invention.

FIG. 1 shows schematically a device 1 according to the invention for the temperature control of an energy storage device 2 of an electrically driven vehicle 3, which is illustrated in a highly simplified manner in FIG. 2. The device 1 comprises an energy storage device 2 for the electrical energy supply of an electric drive unit 4 and/or other electric consumers, not illustrated, of the vehicle 3 illustrated in FIG. 2. The energy storage device 2 can be formed for example in a mild hybrid vehicle with electrified auxiliary units for the supply of these auxiliary units.

The device 1 according to the invention comprises a first coolant circuit 5, a second coolant circuit 8 and a refrigerant circuit 6. At least one partial section of the first coolant circuit 5 and at least one partial section of the second coolant circuit 8 are formed by a shared circuit section 47, in which a coolant cooler 10 is arranged. The coolant cooler 10 is fluidically connected via the shared circuit section 47 with the first coolant circuit 5 and/or with the second coolant circuit 8.

The first coolant circuit 5 is configured for the temperature control of the energy storage device 2 and is able to be coupled with the refrigerant circuit 6 in a heat-transferring manner via at least one refrigerant evaporator 7. The second coolant circuit 8 is able to be coupled with the refrigerant circuit 6 in a heat-transferring manner by means of a refrigerant condenser 9 which is cooled by coolant.

The coolant cooler 10 can bring about a heat transfer between the first coolant circuit 5 and an exterior environment 11 of the device 11 and/or a heat transfer between the second coolant circuit 8 and the exterior environment 11 of the device 1. The coolant cooler 10 can be flowed through and/or flowed around by an exterior air flow 41. This exterior air flow 41 can for example receive and dissipate heat of the coolant, which flows through the coolant cooler 10.

The first coolant circuit 5 has a bypass 12 for the at least partial bypassing or for the complete bypassing of the coolant cooler 10. The first coolant circuit 5 has a valve device 13 for the distribution of a first coolant flow to the shared circuit section 47 and to the bypass 12.

The first coolant circuit 5 has a first coolant conveying device 14, which conveys a coolant through the first coolant circuit 5 along the conveying direction 40.

The valve device 13 is arranged downstream of the energy storage device 2. The valve device 13 is fluidically connected with the energy storage device 2 via a first coolant line 23. The valve device 13 is fluidically connected with a second coolant line 24 and with a bypass 12 with is formed separately thereto. The bypass 12 can be configured as a bypass coolant line. The second coolant line 24 is fluidically connected with the shared circuit section 47 via a first connection point 42. In an embodiment which is not illustrated, the valve device 13 can be arranged downstream of the coolant cooler 10 with respect to the conveying direction 40. In an embodiment which is not illustrated, the valve device 13 can be arranged upstream of the energy storage device 2.

The valve device 13 can be set up in an open position, in which the first coolant flow of the first coolant circuit 5 flows entirely through the shared circuit section 47. The valve device 13 can be set up in an intermediate position, in which the first coolant flow of the first coolant circuit 5 flows partially through the bypass 12 and partially through the shared circuit section 47. The valve device 13 can be set up in a bypass position, in which the first coolant flow of the first coolant circuit 5 flows entirely through the bypass 12.

The shared circuit section 47, the coolant cooler 10 and the bypass 12 are arranged downstream of the valve device 13.

The shared circuit section 47 is fluidically connected with a third coolant line 25 via a second connection point 43. The third coolant line 26 is fluidically connected with a fourth coolant line 26 via a third connection point 44. The first connection point 42 is formed upstream of the coolant cooler 10, whereas the second connection point 43 and the third connection point 44 are formed downstream of the coolant cooler 10. The bypass 12 opens downstream of the valve device 13 in the third connection point 44. The bypass 12 is therefore fluidically connected with the fourth coolant line 26. The fourth coolant line 26 is fluidically connected with the refrigerant evaporator 7. The refrigerant evaporator 7 is arranged downstream of the third connection point 44. The refrigerant evaporator 7 is fluidically connected with the coolant conveying device 14 via a fifth coolant line 27. The coolant conveying device 14 is arranged downstream of the refrigerant evaporator 7. The coolant conveying device 14 is fluidically connected with the energy storage device 2 via a sixth coolant line 28. The energy storage device 2 is arranged downstream of the coolant conveying device 14.

The second coolant circuit 8 has a second coolant conveying device 15, which conveys a coolant through the second coolant circuit 8 along the conveying direction 40. For the sake of clarity, the reference numbers for the coolant lines of the second coolant circuit 8 are presented exclusively in FIG. 2. The second coolant circuit 8 comprises an eighth coolant line 30, which is fluidically connected with the second connection point 43 and the second coolant conveying device 15. The second coolant circuit 8 comprises a ninth coolant line 31, which is fluidically connected with the second coolant conveying device 15 and with the refrigerant condenser 9. The second coolant circuit 8 comprises a seventh coolant line 29, which is fluidically connected with the refrigerant condenser 9 and with the first connection point 42.

It is self-evident that no material exchange takes place between the respective coolant circuit 5 and/or 8 and the refrigerant circuit 6 in the refrigerant evaporator 7 and in refrigerant condenser 9.

The refrigerant circuit 6 comprises a refrigerant conveying device 16, which conveys a refrigerant through the refrigerant circuit 6 along the conveying direction 40. The refrigerant conveying device 16 is fluidically connected with the refrigerant condenser 9 via a third refrigerant line 34. The refrigerant condenser 9 is arranged downstream of the refrigerant conveying device 16. The refrigerant condenser 9 is fluidically connected via a first refrigerant line 32 fluidically with the refrigerant evaporator 7. The refrigerant evaporator 7 is arranged downstream of the refrigerant condenser 9.

Reference is made in the following to FIG. 2, wherein only the differences with respect to FIG. 1 are explained. For the sake of clarity, the reference numbers of FIG. 1 were not presented completely in FIG. 2. However, it is self-evident that the specialist will recognize that identical reference numbers are assigned to identical components of FIG. 1 and FIG. 2.

In FIG. 2 a vehicle 3 according to the invention is illustrated in a highly simplified manner, wherein the vehicle 3 has the device 1 according to the invention and an electric drive unit 4, which can be supplied with electric power by the energy storage device 2 via an energy transfer line 45. Compared to FIG. 1, the device 1 has a fan device 18, which is associated with the coolant cooler 10 and/or is arranged lying opposite thereto. The first coolant circuit 5 further comprises a coolant expansion reservoir 46.

Figure 3:
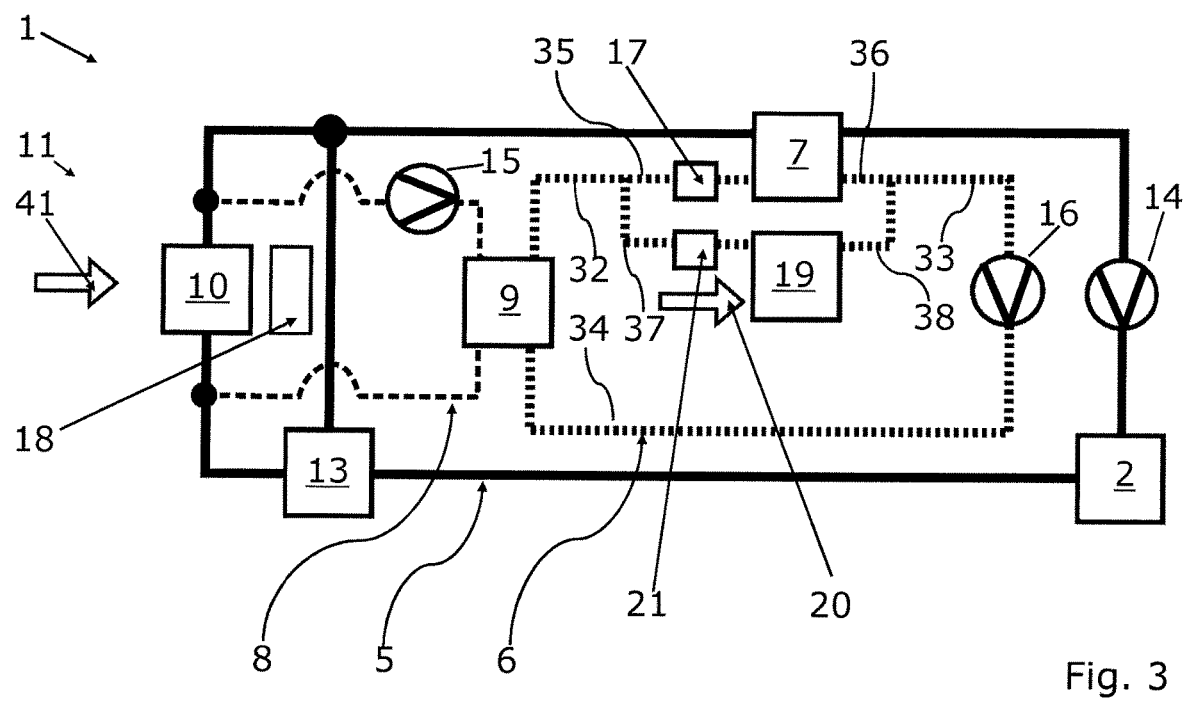
FIG. 3 shows a further embodiment of a device according to the invention.

Reference is made in the following to FIG. 3, wherein only the differences with respect to FIG. 1 are explained. For the sake of clarity, the reference numbers of FIG. 1 and of FIG. 2 are not completely presented in FIG. 3. However, it is self-evident that the specialist will recognize that identical reference numbers are assigned to identical components of FIG. 1 and FIG. 2 and FIG. 3.

In FIG. 3 the refrigerant circuit 6 has a branch of the first refrigerant line 32, which branches into a fourth refrigerant line 35 and a sixth refrigerant line 37 upstream of the refrigerant evaporator 7. The fourth refrigerant line 35 is fluidically connected with the refrigerant evaporator 7 and has the first expansion valve device 17, which is arranged upstream of the refrigerant evaporator 7.

The sixth refrigerant line 37 is fluidically connected with an evaporator device 19 for the temperature control of a vehicle interior air flow 20 and has a second expansion valve device 21, which is arranged upstream of the evaporator device 19.

The refrigerant evaporator 7 is fluidically connected with the second refrigerant line 33 via a fifth refrigerant line 36. The evaporator device 19 is fluidically connected with the second refrigerant line 33 via a seventh refrigerant line 38.

Figure 4:
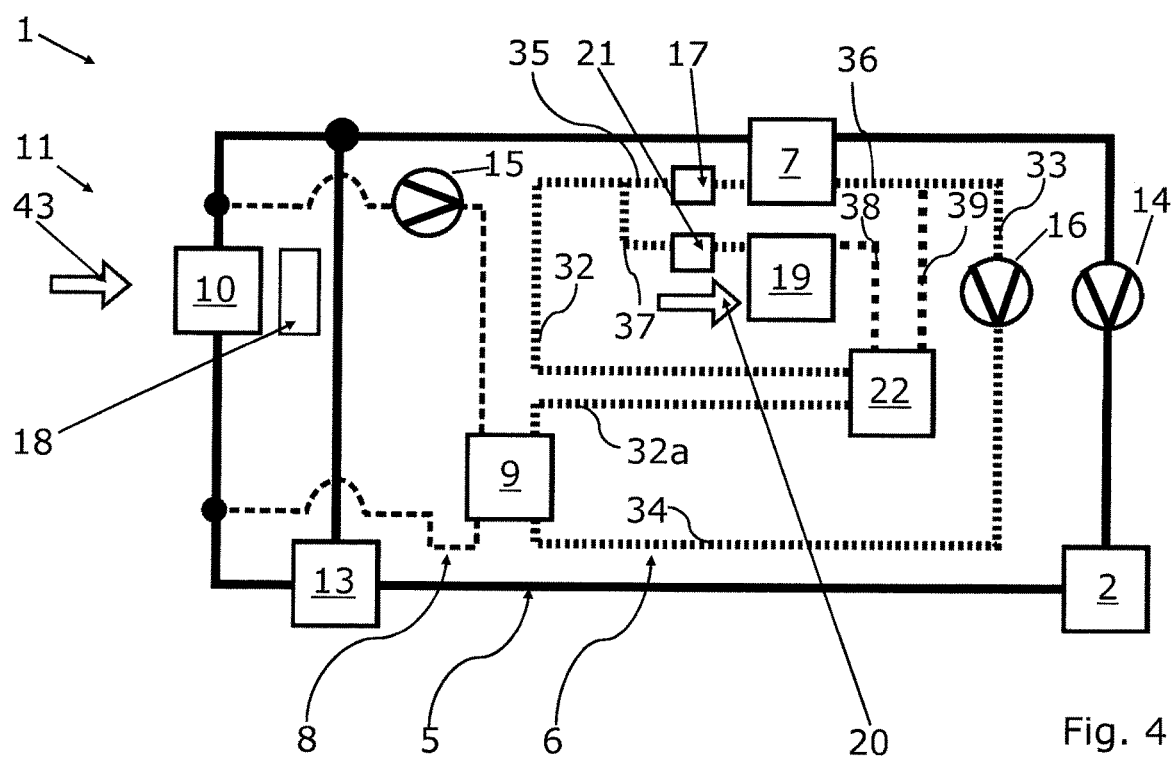
FIG. 4 shows a further embodiment of a device according to the invention.

Reference is made in the following to FIG. 4, wherein only the differences with respect to FIG. 3 are explained. For the sake of clarity, the reference numbers of FIG. 1, of FIG. 2, and of FIG. 3 are not presented entirely in FIG. 4. However, it is self-evident that the specialist will recognize that identical reference numbers are assigned to identical components of FIG. 1 and FIG. 2 and FIG. 3 and FIG. 4.

In FIG. 4 an interior heat exchanger 22 is arranged, which is fluidically connected on the one hand with the first refrigerant line 32 and a refrigerant line section 32a, and on the other hand is fluidically connected with the seventh refrigerant line 38 and an eighth refrigerant line 39. A fluid refrigerant flows downstream of the refrigerant condenser 9 into the refrigerant line section 32a and flows through the interior heat exchanger 22, in order to flow into the first refrigerant line 32. A vaporous refrigerant flows downstream of the evaporator device 19 into the seventh refrigerant line 38 and flows through the interior heat exchanger 22, in order to flow into the eighth refrigerant line 39. Here, the vaporous refrigerant can bring about a pre-cooling of the fluid refrigerant, in order to increase the efficiency of the refrigerant circuit.

The mode of operation of the device 1 according to the invention is to be explained in the following by way of example:

At low ambient temperatures, at which the refrigerant circuit is required neither for the cooling nor for the dehumidification of a vehicle interior air flow 20, a temperature control of the energy storage device 2 can take place exclusively via the first coolant circuit 5, wherein for this the operation of the refrigerant circuit 6 and the operation of the second coolant circuit 8 can be adjusted. Here, through the switching off of components, in particular of conveying devices, the energy consumption of the device 1 according to the invention can be reduced. The temperature-control performance can be regulated here in a variable manner via the valve device 13.

At moderate ambient temperatures, at which the refrigerant circuit 6 is required for the air conditioning (e.g. dehumidification or cooling) of the vehicle interior air flow 20 of the vehicle 3, the first coolant circuit 5 and the second coolant circuit 8 and the refrigerant circuit 6 can be operated simultaneously. As long as the ambient temperature lies below the threshold temperature which is valid for the coolant of the coolant circuit 5 and the waste heat of the refrigerant circuit 6 is not too great or respectively is moderate, the waste heat which is dissipated from the energy storage device 2, and the waste heat of the refrigerant circuit 6, which occurs during the air conditioning of the vehicle interior air flow 20, can be dissipated jointly via the coolant cooler 10. Here, provision can be made that a first coolant flow of the first coolant circuit 5 and a second coolant flow of the second coolant circuit 8 mix with each other at least in the shared circuit section 47. This mixing takes place in particular upstream of the coolant cooler 10. After the flowing out from the coolant cooler 10, the mixed coolant flow is divided again into a first coolant flow and a second coolant flow. The dividing of the coolant flows downstream of the coolant cooler 10 can be adapted for example via the conveying performance of the coolant conveying devices 14 and 15. In such a configuration, the refrigerant circuit 6 is set up so that no heat transfer takes place between the first coolant circuit 5 and the refrigerant circuit 6, although the first coolant flow flows through the refrigerant evaporator 7. This can be brought about for example in that a flowing in of the refrigerant into the refrigerant evaporator 7 is prevented. In such a configuration, it is also conceivable that the waste heat which occurs during the air conditioning of a vehicle interior air flow 20 is used in order to heat the energy storage device 2. Here, a heat dissipation from the coolant at the coolant cooler 10 can be prevented for example by means of a radiator shutter.

At ambient temperatures above the predefined threshold temperature, a direct cooling via the first coolant circuit 5 with the coolant cooler 10 is not possible, because after simultaneous dissipation of the waste heat of the first coolant circuit 5 and of the refrigerant circuit 6, the coolant exiting from the coolant cooler 10 would lie above a threshold temperature for the first coolant circuit 5. Therefore, at high ambient temperatures above a predefined threshold temperature, the valve device 13 is operated in the bypass position and at the same time a flowing through of the refrigerant evaporator 7 with refrigerant of the refrigerant circuit 6 is enabled. Hereby, the waste heat of the energy storage device 2 can be transferred via the refrigerant evaporator 7 to the refrigerant circuit 6. The refrigerant circuit 6 in turn transfers the received heat to the second coolant circuit 8, which in turn emits the received heat via the coolant cooler 10 to the exterior environment 11. In this configuration, a first coolant flow forms in the first coolant circuit 5 and a second coolant flow forms in the second coolant circuit 8, wherein the first coolant flow and the second coolant flow circulate spatially separately from one another in the device 1 in such a way that a heat transfer from the second coolant flow to the first coolant flow is prevented. This takes place for example through the valve device 13, because the latter is in the bypass location and/or bypass position.

If no requirement exists for an air conditioning of an interior of the vehicle 3, the refrigerant circuit 6 can also be operated exclusively for the heat dissipation of heat of the first coolant circuit 5.

The invention claimed is:

1. A temperature control device of a vehicle, comprising:
an energy storage device configured to provide an electrical energy supply to at least one of an electric drive unit and an electric consumer of the vehicle;
a first coolant circuit configured to temperature control the energy storage device;
a refrigerant circuit couplable with the first coolant circuit in a heat-transferring manner via at least one refrigerant evaporator;
a second coolant circuit couplable with the refrigerant circuit in a heat-transferring manner via a refrigerant condenser, which is coolable via a coolant;
a coolant cooler for transferring heat between an exterior environment and at least one of the first coolant circuit and the second coolant circuit;
at least one partial section of the first coolant circuit and at least one partial section of the second coolant circuit defined by a shared circuit section;
wherein the coolant cooler is arranged in the shared circuit section;
wherein the coolant cooler is fluidically connectable with at least one of the first coolant circuit and the second coolant circuit via the shared circuit section;
wherein the first coolant circuit includes a bypass for at least partially bypassing the coolant cooler;
wherein the first coolant circuit includes a valve structured and arranged to distribute a first coolant flow to at least one of the shared circuit section and the bypass; and
wherein the valve includes (i) a first outlet connected to the coolant chiller and (ii) a second outlet connected to the bypass.

2. The device according to claim 1, wherein at least one of:
when in a first operation configuration, the first coolant circuit and the refrigerant circuit are substantially decoupled with respect to a heat transfer via the at least one refrigerant evaporator; and when in a second operation configuration, the first coolant circuit and the refrigerant circuit are thermally coupled for the heat transfer from the first coolant circuit to the refrigerant circuit via the at least one refrigerant evaporator.

3. The device according to claim 1, wherein, when in a first operation configuration:
the first coolant circuit and the refrigerant circuit are substantially decoupled with respect to a heat transfer via the at least one refrigerant evaporator; and
the valve is disposed in at least one of:
an open position in which the first coolant flow of the first coolant circuit flows entirely through the shared circuit section;
at least one intermediate position in which the first coolant flow of the first coolant circuit flows partially through the bypass and partially through the shared circuit section; and
a bypass position in which the first coolant flow of the first coolant circuit flows entirely through the bypass.

4. The device according to claim 1, wherein, when in a second operation configuration:
the first coolant circuit and the refrigerant circuit are coupled in a heat-transferring manner with respect to a heat transfer via the at least one refrigerant evaporator;
the valve is in a bypass position in which the first coolant flow of the first coolant circuit flows entirely through the bypass such that the first coolant circuit and the second coolant circuit are substantially decoupled from one another fluidically;
the first coolant circuit and the refrigerant circuit are thermally coupled for the heat transfer from the first coolant circuit to the refrigerant circuit via the at least one refrigerant evaporator;
the refrigerant circuit and the second coolant circuit are thermally coupled for a heat transfer from the refrigerant circuit to the second coolant circuit via the refrigerant condenser; and
the second coolant circuit and the coolant cooler are thermally coupled for a heat transfer from the second coolant circuit to the exterior environment via the coolant cooler.

5. The device according to claim 1, wherein the refrigerant circuit includes at least one of:
an evaporator for temperature controlling a vehicle interior air flow; and
an interior heat exchanger for pre-cooling a fluid refrigerant flow of the refrigerant circuit.

6. The device according to claim 1, wherein, when in a first operation configuration, (i) the first coolant circuit and the refrigerant circuit are substantially decoupled with respect to a heat transfer via the at least one refrigerant evaporator, and (ii) at least one of:
an evaporator is integrated into the refrigerant circuit for temperature controlling a vehicle interior air flow;
the refrigerant circuit and the second coolant circuit are thermally coupled for a heat transfer from the refrigerant circuit to the second coolant circuit via the refrigerant condenser;
the first coolant circuit, the second coolant circuit, and the coolant cooler are thermally coupled for a heat transfer from the first coolant circuit and from the second coolant circuit to the exterior environment via the coolant cooler; and the refrigerant circuit and the second coolant circuit are thermally decoupled for preventing a heat transfer from the refrigerant circuit to the second coolant circuit via the refrigerant condenser.

7. The device according to claim 5, wherein:
the refrigerant circuit includes the evaporator; and
when in a second operation configuration, (i) the first coolant circuit and the refrigerant circuit are thermally coupled for a heat transfer from the first coolant circuit to the refrigerant circuit via the at least one refrigerant evaporator, and (ii) the evaporator is one of:
integrated into the refrigerant circuit;
separated fluidically from the refrigerant circuit.

8. The device according to one of claim 1, wherein the refrigerant circuit includes an interior heat exchanger through which a vaporous refrigerant flow of the refrigerant circuit is flowable for pre-cooling a fluid refrigerant flow of the refrigerant circuit.

9. The device according to claim 1, wherein at least one of:
the first coolant circuit includes a first coolant conveyor for conveying the first coolant flow in the first coolant circuit along a conveying direction;
the second coolant circuit includes a second coolant conveyor for conveying a second coolant flow in the second coolant circuit along a conveying direction; and
the refrigerant circuit includes a refrigerant conveyor for conveying a refrigerant flow in the refrigerant circuit along a conveying direction.

10. A vehicle, comprising:
at least one of an electric drive unit and an electric consumer;
an energy storage device configured to provide an electrical energy supply to the at least one of the electric drive unit and the electric consumer;
a temperature control device configured to temperature control the energy storage device;
the temperature control device including:
a first coolant circuit configured to temperature control the energy storage device;
a refrigerant circuit couplable with the first coolant circuit in a heat-transferring manner via at least one refrigerant evaporator;
a second coolant circuit couplable with the refrigerant circuit in a heat-transferring manner via a refrigerant condenser, which is coolable via a coolant;
a coolant cooler for transferring heat between an exterior environment and at least one of the first coolant circuit and the second coolant circuit;
at least one partial section of the first coolant circuit and at least one partial section of the second coolant circuit defined by a shared circuit section;
wherein the coolant cooler is arranged in the shared circuit section;
wherein the coolant cooler is fluidically connectable with at least one of the first coolant circuit and the second coolant circuit via the shared circuit section;
wherein the first coolant circuit includes a bypass for at least partially bypassing the coolant cooler;
wherein the first coolant circuit includes a valve structured and arranged to distribute a first coolant flow to at least one of the shared circuit section and the bypass; and
wherein the valve includes (i) a first outlet connected to the coolant chiller and (ii) a second outlet connected to the bypass.

11. The device according to claim 1, wherein the valve is adjustable to:
- an open position in which the first coolant flow of the first coolant circuit flows entirely through the shared circuit section;
- an intermediate position in which the first coolant flow of the first coolant circuit flows partially through the bypass and partially through the shared circuit section; and
- a bypass position in which the first coolant flow of the first coolant circuit flows entirely through the bypass.

12. The device according to claim 1, wherein the refrigerant circuit includes:
- an evaporator for temperature controlling a vehicle interior air flow; and
- an interior heat exchanger for pre-cooling a fluid refrigerant flow of the refrigerant circuit.

13. The device according to claim 1, wherein, when in a first operation configuration:
- the first coolant circuit and the refrigerant circuit are substantially decoupled with respect to a heat transfer via the at least one refrigerant evaporator; and
- an evaporator is integrated into the refrigerant circuit for temperature controlling a vehicle interior air flow.

14. The device according to claim 1, wherein:
- the first coolant circuit includes a first coolant conveyor for conveying the first coolant flow in the first coolant circuit;
- the second coolant circuit includes a second coolant conveyor for conveying a second coolant flow in the second coolant circuit; and
- the refrigerant circuit includes a refrigerant conveyor for conveying a refrigerant flow in the refrigerant circuit.

15. The device according to claim 5, wherein:
- the refrigerant circuit includes the evaporator;
- when in a second operation configuration, the first coolant circuit and the refrigerant circuit are thermally coupled for a heat transfer from the first coolant circuit to the refrigerant circuit via the at least one refrigerant evaporator; and
- when in the second operation configuration, the evaporator is separated fluidically from the refrigerant circuit.

16. The device according to claim 1, wherein the bypass is structured and arranged to bypass the shared circuit section.

17. The device according to claim 1, wherein:
- the first coolant circuit and the second coolant circuit are connected to one another at a first connection point and at a second connection point; and
- the shared circuit section extends from the first connection point to the second connection point.

18. The device according to claim 17, wherein:
- an end of the bypass opposite the valve is connected to the first cooling circuit at a third connection point disposed downstream of the coolant cooler;
- the first connection point is disposed between the valve and the coolant cooler; and
- the second connection point is disposed between the coolant cooler and the third connection point.

19. A temperature control device of a vehicle, comprising:
- an energy storage device configured to provide an electrical energy supply to at least one of an electric drive unit and an electric consumer of the vehicle;
- a first coolant circuit configured to temperature control the energy storage device;
- a refrigerant circuit couplable with the first coolant circuit in a heat-transferring manner via at least one refrigerant evaporator;
- a second coolant circuit couplable with the refrigerant circuit in a heat-transferring manner via a refrigerant condenser, which is coolable via a coolant;
- a coolant cooler for transferring heat between an exterior environment and at least one of the first coolant circuit and the second coolant circuit;
- at least one partial section of the first coolant circuit and at least one partial section of the second coolant circuit defined by a shared circuit section;
- wherein the coolant cooler is arranged in the shared circuit section;
- wherein the coolant cooler is fluidically connectable with at least one of the first coolant circuit and the second coolant circuit via the shared circuit section;
- wherein the first coolant circuit includes a bypass bypassing the shared circuit section; and
- wherein the first coolant circuit includes a valve structured and arranged to distribute a first coolant flow to at least one of the shared circuit section and the bypass.

20. The device according to claim 19, wherein:
- the first coolant circuit and the second coolant circuit are connected to one another at a first connection point and at a second connection point; and
- the shared circuit section extends from the first connection point to the second connection point.

* * * * *

UNITED STATES PATENT AND TRADEMARK OFFICE
CERTIFICATE OF CORRECTION

PATENT NO. : 11,837,708 B2  
APPLICATION NO. : 17/070902  
DATED : December 5, 2023  
INVENTOR(S) : Markus Boger Page 1 of 1

It is certified that error appears in the above-identified patent and that said Letters Patent is hereby corrected as shown below:

On the Title Page

At Column 1, Item (30) Foreign Application Priority Data, please add the missing priority information. It should read as follows, October 15, 2019 (DE).... 10 2019 215 846.3

Signed and Sealed this  
Twenty-ninth Day of April, 2025

Coke Morgan Stewart  
*Acting Director of the United States Patent and Trademark Office*